(12) United States Patent
Cheung et al.

(10) Patent No.: US 9,603,490 B2
(45) Date of Patent: Mar. 28, 2017

(54) HAND BLENDER WITH A BUILT-IN 2-SPEED GEARBOX

(71) Applicant: Huiyang Allan Plastic & Electric Industries Co., Limited, Guangdong Province (CN)

(72) Inventors: Shu Sang Cheung, Guangdong Province (CN); To Yin Pang, Guangdong Province (CN); Hailiang Luo, Guangdong Province (CN)

(*) Notice: Subject to any disclaimer, the term of this patent is extended or adjusted under 35 U.S.C. 154(b) by 614 days.

(21) Appl. No.: 14/150,771

(22) Filed: Jan. 9, 2014

(65) Prior Publication Data

US 2015/0009776 A1    Jan. 8, 2015

(30) Foreign Application Priority Data

Jul. 3, 2013 (CN) .......................... 2013 1 0276508

(51) Int. Cl.
*A47J 43/08* (2006.01)
*A47J 43/044* (2006.01)

(52) U.S. Cl.
CPC .... *A47J 43/082* (2013.01); *A47J 2043/04427* (2013.01)

(58) Field of Classification Search
CPC ..................... A47J 43/082; A47J 43/08; A47J 2043/04427; B01F 13/002; B01F 7/00725
USPC ......................................... 366/129, 252, 283
See application file for complete search history.

(56) References Cited

U.S. PATENT DOCUMENTS

| 3,196,752 A * | 7/1965 | Wahlstrom ............... B23Q 5/46 409/156 |
| 2007/0159917 A1* | 7/2007 | Beesley .................. A47J 43/06 366/129 |
| 2012/0167712 A1* | 7/2012 | Cheung ................. A47J 43/085 74/650 |

* cited by examiner

*Primary Examiner* — Charles Cooley
*Assistant Examiner* — Marc C Howell
(74) *Attorney, Agent, or Firm* — Prakash Nama; Global IP Services, PLLC

(57) ABSTRACT

A hand blender with a built-in 2-speed gearbox, having its output shaft rotating clockwise whenever the motor rotates clockwise or anticlockwise. By using a differential transmission assembly and a one-way bearing, two different output speeds are realized. Thus, different types of food can be processed with different stirring speeds, and a single type of food can be processed with different stirring speeds in different mixing stages of a stirring process.

8 Claims, 5 Drawing Sheets

HAND BLENDER WITH A BUILT-IN 2-SPEED GEARBOX

BACKGROUND OF THE INVENTION

The present invention relates to a hand-held blender, and in particular to a hand blender with a built-in 2-speed gearbox which can output two different speeds coaxially.

Hand-held food blenders become more and more popular because they are compact in terms of size and are convenient to use. Most hand blenders have only one stirring speed, thereby failing to meet the demand for stirring different types of food because the stirring speed is not high enough or is too low. In the process of stirring, it is more suitable to stir some materials in low speed after high speed blending in order to achieve better taste and preserve better nutritional value. A conventional hand-held blender fails to achieve these.

In addition, Chinese patent publication CN1697622 discloses a hand blender. The output shaft and input shaft of the hand blender are not coaxially arranged. The disclosed hand blender achieves speed reduction only through engagement of a broadside of a driving gear with a driven gear. A defect of this structure is unstable transmission. To achieve large transmission ratio while enlarging diameters of the gears, it is necessary to increase the volume of the housing, especially an increase in radial measurement of the housing, and there are also spaces wasted in the interior housing.

BRIEF SUMMARY OF THE INVENTION

The present invention provides an improved hand blender with a built-in 2-speed gearbox.

A hand blender with a built-in 2-speed gearbox includes
a housing;
a stirring tool;
a motor secured in the housing;
an input shaft connected to the motor and configured to rotate synchronously with the motor;
an output shaft meshing with the stirring tool and configured for outputting power to the stirring tool;
a gearbox meshing with the input shaft and the output shaft, and configured for driving the output shaft to rotate in a first direction with a first speed when the motor rotates in the first direction, and for driving the output shaft to rotate in the first direction with a second speed when the motor rotates in a reverse direction.

Preferably, the input shaft and the output shaft are coaxially arranged, the gearbox comprises a constant transmission assembly, the constant transmission assembly is a one-way bearing I, an inner ring and an outer ring of the one-way bearing I are respectively engaged with the input shaft and the output shaft and are rotated coaxially therewith; rollers of the one-way bearing I are unlocked when the inner ring rotates in a second direction opposite to the first direction.

Preferably, an upper end of the output shaft defines a counter bore, the outer ring of the one-way bearing I is fixed in the counter bore.

Preferably, the gearbox comprises a differential transmission assembly engaged with the input shaft and the output shaft; the differential transmission assembly is configured to transmit power to the output shaft when the motor rotates in a second direction that is opposite to the first direction, permitting the output shaft to rotate in the first direction with the second speed that is slower than the first speed.

Preferably, the differential transmission assembly comprises:

a sun gear which sleeves the input shaft and rotates along with the input shaft;
an annular gear fixed in the housing;
a planet gear set received in the annular gear and directly engaged with both the sun gear and the annular gear;
a planetary carrier for holding the planet gear set;
an upper transmission turntable which is steadily connected with the planetary carrier and rotates synchronously with the planetary carrier;
an upper bevel ring arranged at a lower end surface of the upper transmission turntable which faces the stirring tool;
a plurality of bevel gears engaged with the upper bevel ring directly and uniformly and circumferentially distributed on the upper bevel ring;
a bevel gear carrier fixed to the housing and configured for holding the plurality of bevel gears therein, wherein an inner surface of the bevel gear carrier defines a plurality of holes for receiving gear axes of the plurality of bevel gears;
a lower transmitting turntable arranged under the bevel gear and sleeved on the output shaft, wherein an upper end surface of the lower transmitting turntable is arranged with a lower bevel ring which directly engages with the plurality of bevel gears; and
a one-way bearing II configured at one or both of the following positions: 1) between the input shaft and the sun gear, and 2) between the lower transmitting turntable and the output shaft;
wherein rollers of the one-way bearing II are unlocked when an inner ring of the one-way bearing II rotates in a first direction.

Preferably, the planet gear set comprises 3~5 planet gears, the planet gears are all circumferentially distributed uniformly on a lower end surface of the planetary carrier by vertical spindles.

Preferably, a plurality of fixed pins fixes the planetary carrier and the upper transmission turntable to realize synchronous rotation of the planetary carrier and the upper transmitting turntable.

Preferably, the fixed pins are the vertical spindles extending downwardly into the interpenetrating holes preinstalled in the planetary carrier.

Preferably, a number of the bevel gears is 3~5, the bevel gears are arranged in the bevel gear carrier by gear axes, the gear axes are perpendicular to the output shaft.

Preferably, a lower end of the output shaft is provided with a connector which is connected with the stirring tool.

Preferably, an upper end cover and a lower end cover are configured under the motor and above the connector, respectively.

The present invention has the following beneficial effects:
1. Due to coordination between the constant transmission assembly and the differential transmission assembly, the hand blender of the present invention can coaxially outputs two different rotational speeds along a same direction, that is, the same stirring connector can achieve two different rotational speeds. Not only can it achieves different stirring speeds required by different types of food, but also achieves different stirring speeds required by the same type of food in different mixing phase during stirring process. Therefore, the present invention has obvious improvements in these respects 2. Because the hand blender can output two different speeds along a same rotational direction, the connector has better adaptability and better flexibility when it is connected with different stirring tools or cutting tools. The present invention does not require any changes of the standard design of its accessory parts due to different rotational directions required respectively in two different speeds, such as the turning directions of the blades of the stirring tool, the turning directions of the blades of a cross cutting tool, and the turning directions of the blades of a squeeze screw etc. 3. The vertically integrated and composite structure of the constant transmission assembly and the differential transmission assembly arranged in the housing together with the motor realizes coaxial linear transmission, therefore the present invention can save many spaces, and can reduce the volume of the hand blender. The compact structure also ensures stable transmission. 4. A low speed can be used for stirring hot food or hot liquid to avoid danger in case the hot food or liquid is thrown out or spilled out during stirring process.

DETAILED DESCRIPTION OF THE INVENTION

Embodiments of the present disclosure will now be described in detail below, with reference to the accompanying drawings.

Embodiment I

Figure 1:
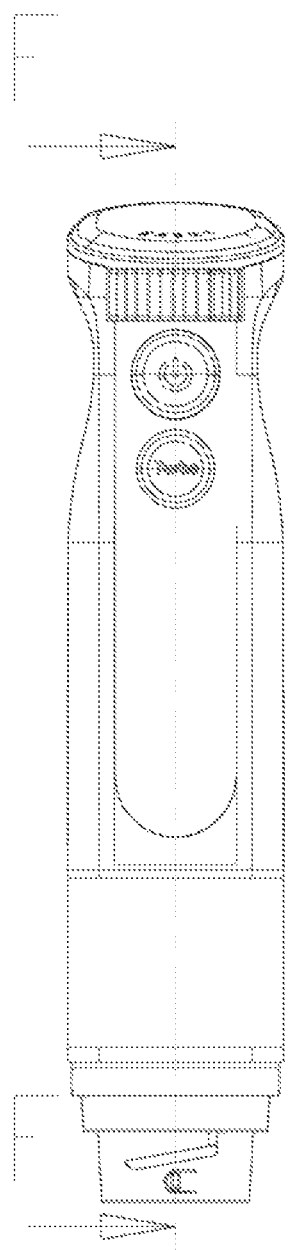
FIG. 1 is a perspective view of a hand blender of the present invention.
Figure 2:
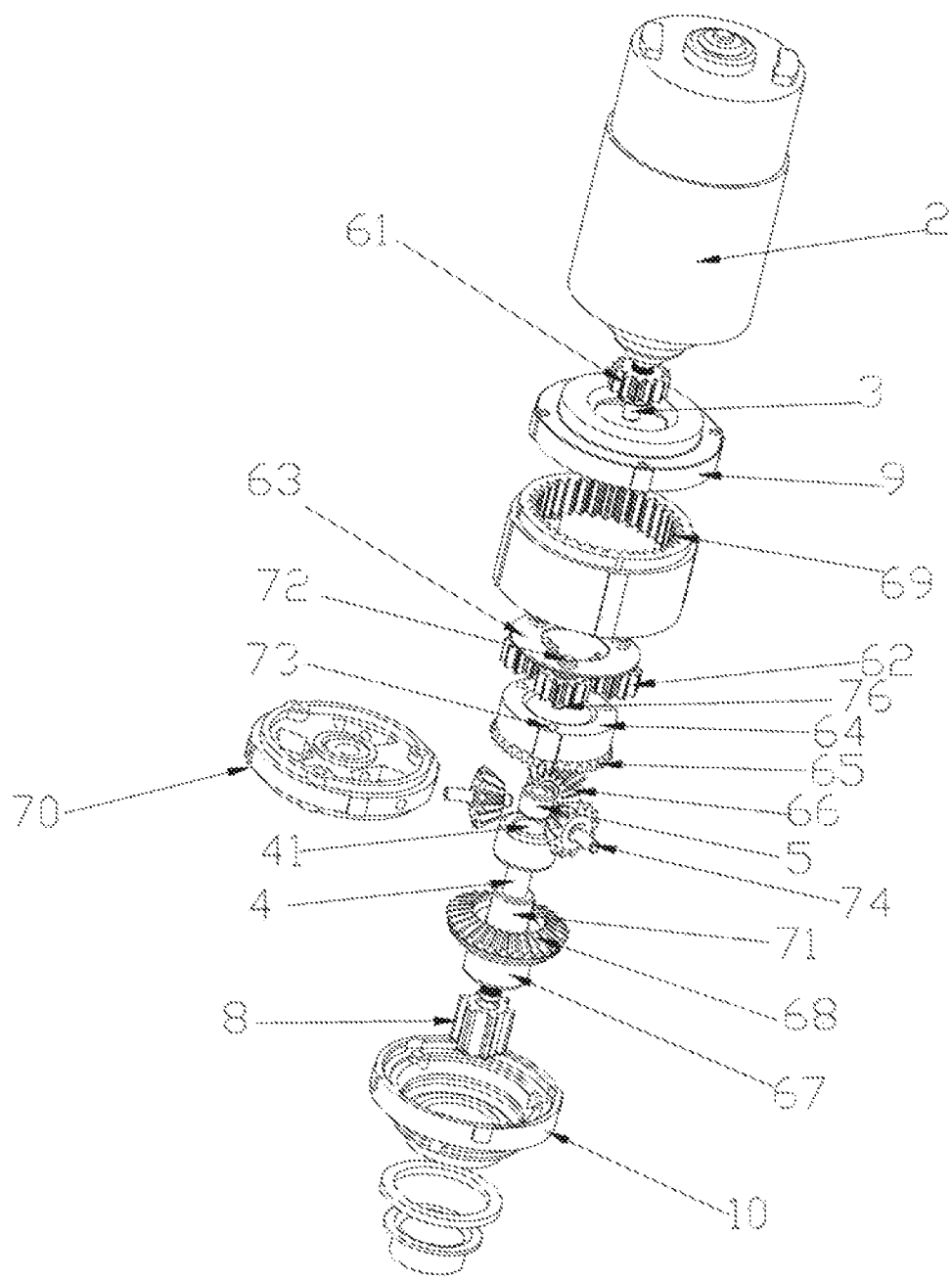
FIG. 2 is an exploded view of the hand blender according to a first embodiment of the present invention.
Figure 3:
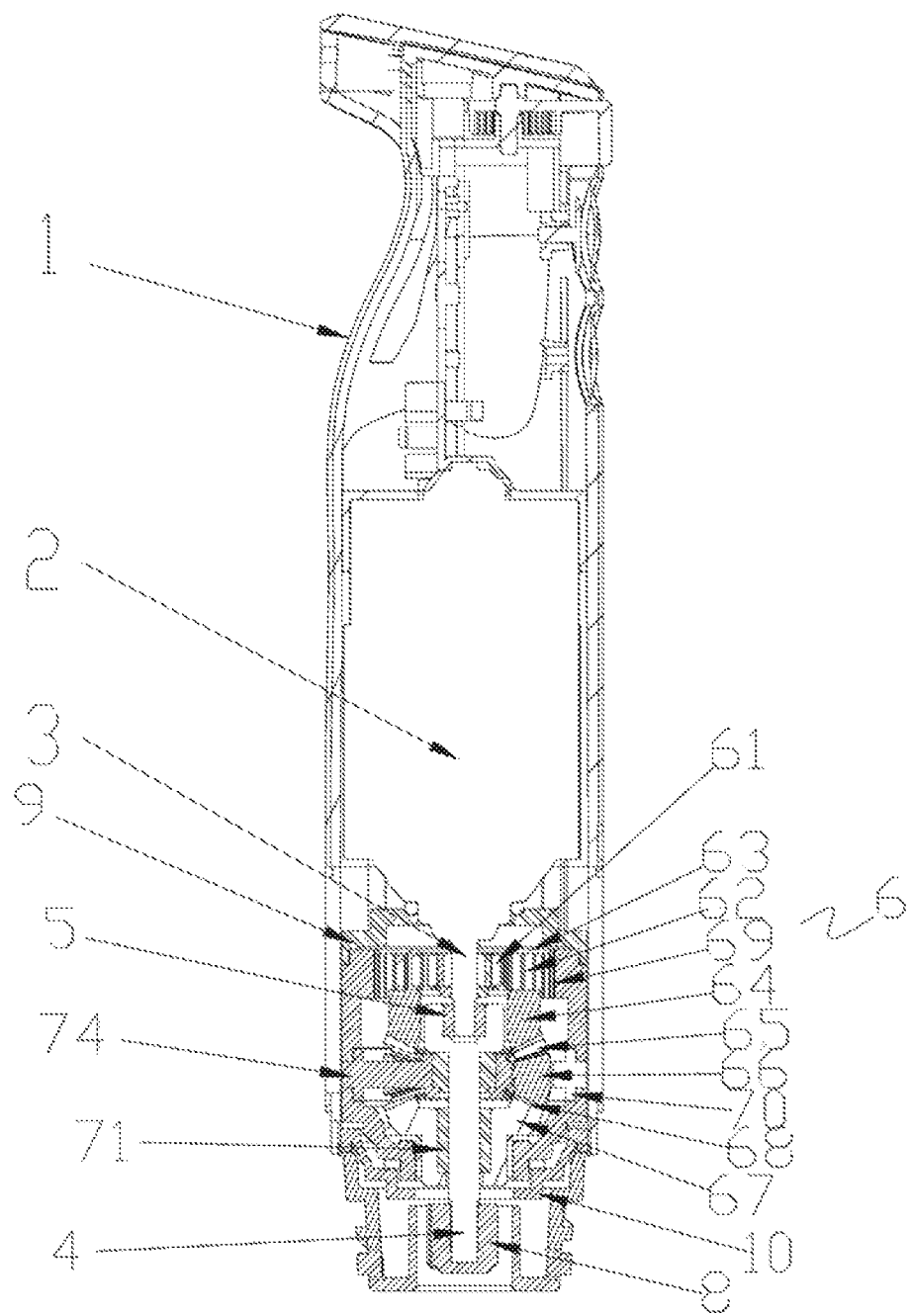
FIG. 3 is a cross-sectional view of a hand blender according to a first embodiment of the present invention.

As shown in FIGS. 1-3, a hand blender with a built-in 2-speed gearbox according to a first embodiment of the present invention includes a housing 1, a motor 2 arranged in the housing 1, an input shaft 3 synchronously rotatable with a rotor of the motor 2, an output shaft 4 for outputting power to a stirring tool, an upper end cover 9 configured in the housing under the motor, a connector 8, a lower end cover 10 arranged in the housing above the connector, a constant transmission assembly 5, and a differential transmission assembly 6. The constant transmission assembly 5 and the differential transmission assembly 6 are arranged between the input shaft 3 and the output shaft 4, and are configured to drive the output shaft 4 to rotate clockwise whenever the motor rotates clockwise or anticlockwise. The connector 8 is set at a lower end of the output shaft 4 and engages with the stirring tool. The output shaft and the input shaft are coaxially arranged. The constant transmission assembly 5 is a one-way bearing I which is locked to rotate clockwise. An inner ring and an outer ring of the one-way bearing I respectively engages with the input shaft and the output shaft and rotate coaxially. The one-way bearing I is locked to rotate clockwise means that the one-way bearing I transmits rotation to the output shaft 4 when the input shaft rotates clockwise, and rollers of the one way bearing I are unlocked when the inner ring rotates anticlockwise and thus cannot transmit rotation to the output shaft. An upper end of the output shaft defines a counter bore 41, the outer ring of the one-way bearing I is fixed in the counter bore. The differential transmission assembly 6 includes a sun gear 61 sleeved on the input shaft and capable of rotating clockwise along with the input shaft, a planet gear set 62 engaging with the sun gear, and a planetary carrier 63 for receiving the planet gear set. The planet gear set 62 comprises 3~5 planet gears, the planet gears are uniformly distributed circumferentially on a lower end surface of the planetary carrier via vertical spindles 72. The vertical spindles 72 extend downwardly into respective interpenetrating holes 73 defined in an upper transmission turntable 64 so as to be fixed therein to form fixed pins.

The planetary carrier 63 is fixed and synchronously rotatable with the upper transmission turntable 64. An upper bevel ring 65 is configured at a lower end surface of the upper transmitting turntable 64. The upper bevel ring 65 directly engages with a plurality of bevel gears 66 which are uniformly and circumferentially distributed around the upper bevel ring. A lower transmitting turntable 67 is arranged under the bevel gears, an upper end surface of the lower transmitting turntable 67 is arranged with a lower bevel ring 68 which directly engages with the bevel gears, the lower transmitting turntable 67 sleeves the output shaft. The planet gear set 62 directly engages with an annular gear 69 fixed in the housing. The bevel gears are arranged in a bevel gear carrier 70, the bevel gear carrier is fixed in the housing. The number of the bevel gears may be three to five, and the bevel gears are arranged in the bevel gear carrier via a plurality of gear axes 74. The gear axes 74 and the output shaft 4 are mutually vertical. A one-way bearing II 71 which is locked to rotate clockwise is arranged between the lower transmitting turntable and the output shaft.

The motor 2 drives the input shaft 3 to rotate, when the input shaft 3 rotates clockwise, the power is transmitted to the output shaft 4 by the one-way bearing I which is locked to rotate clockwise, the output shaft 4 drives an agitator arm connected with the connector 8 to rotate clockwise, the connector 8 can detachably connect different tools such as a stirring tool, a cutting tool, etc. Besides, the input shaft 3 also drives the differential transmission assembly 6 to rotate, specifically, when the sun gear 61 rotates clockwise, thus drives the planet gear set 62 to rotate clockwise, the annular gear 69 rotates along with the planet gear set 62, the upper transmitting turntable 64 integrated with the planet gear set 62 and the upper bevel ring 65 also rotate clockwise. The bevel gears 66 transmit power to the lower bevel ring 68, making the lower transmission turntable 67 rotate anticlockwise, thus the rollers of the one-way bearing II 71 are unlocked, and power cannot be transmitted to the output shaft 4, therefore, the input speed and the output speed ratio is 1:1.

When the input shaft 3 rotates anticlockwise, the rollers of the one-way bearing I are unlocked, power cannot be directly transmitted to the output shaft 4. At this moment, the input shaft 3 also drives the sun gear 61 to rotate anticlockwise, the sun gear 61 thus drives the planet gear set 62 to rotate, the annular gear 69 rotates with the planet gear set 62, the upper transmitting turntable 64 integrated with the planet gear set 62 and the upper bevel ring 65 also rotate anticlockwise. The bevel gear 66 transmits power to the lower bevel ring 68, to make the lower transmitting turntable 67 rotating clockwise, power is then transmitted to the output shaft 4 by the one-way bearing II 71 which is locked to rotate clockwise, and an output speed is smaller than an input speed. Therefore, the blender can coaxially output two different speeds in the same direction by the clockwise and anticlockwise rotation of the input shaft.

Embodiment II

Figure 4:
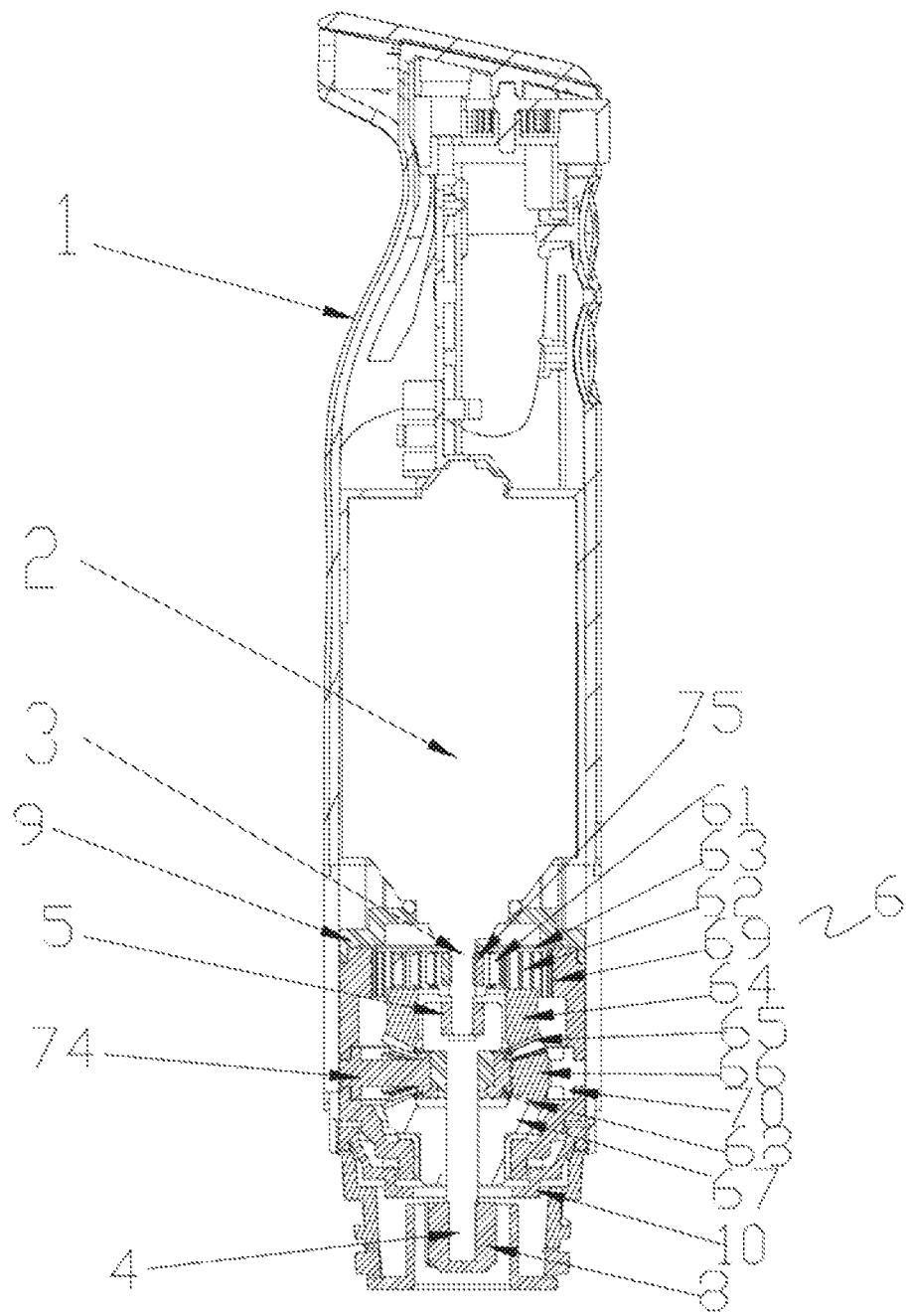
FIG. 4 is a cross-sectional view of a hand blender according to a second embodiment of the present invention.

As shown in FIG. 4, the structure of the hand blender with a built-in 2-speed gearbox revealed in this embodiment is similar to the structure disclosed in embodiment I, the difference is that, bearing one-way bearing II 75 is arranged between the input shaft 3 and the sun gear 61, and is locked to rotate anticlockwise. The one-way bearing II 71 disclosed in embodiment I is omitted and is not arranged between the lower transmuting turntable 67 and the output shaft 4, the lower transmitting turntable rigidly connects with the output shaft. When the input shaft 3 rotates clockwise, the one-way bearing II 75 rotates freely, the driving force of the input shaft 3 cannot transmit to the differential transmission assembly 6, power is transmitted to the output shaft 4 via the one bearing I, the output shaft 4 rotates clockwise in a transmission ratio of 1.1. The output shaft 4 drives the differential transmission assembly 6 rotating through the lower transmitting turntable 67, power is transmitted to the sun gear 61 from the bevel gears 66, the upper transmitting turntable 64 and the planet gear set 62, the sun gear 61 rotates anticlockwise and drives the outer ring of the one-way bearing II 75 to rotate anticlockwise, thus the rollers of the one-way bearing II 75 are unlocked, the sun gear cannot transmit power to the input shaft 3 so as not to cause dynamic interference. At the same time, the output shaft 4 drives the agitator arm connected with the connector 8 to rotate, the connector 8 can detachably connect different tools such as a stirring tool, a cutting tool, etc.

When the input shaft 3 rotates anticlockwise, the rollers of the one-way bearing I are unlocked, power is not directly transmitted to the output shaft 4. At this moment, the input shaft 3 drives the differential transmission assembly 6 rotating through the one way bearing II 75, specifically, the sun gear 61 rotates anticlockwise, the sun gear 61 drives the planet gear set 62 to rotate, the annular gear 69 rotates with the planet gear set 62, the upper transmitting turntable 64 integrated with the planet gear set 62 and the upper bevel ring 65 also rotate anticlockwise. Power is transmitted to the lower bevel ring 68 through the bevel gears 66, so that the lower transmitting turntable 67 rotate clockwise, thereby driving the output shaft 4 to rotate clockwise. The output speed of the output shaft is smaller than the input speed of the input shaft. Therefore, the blender coaxially outputs two different speeds in the same direction by the clockwise and anticlockwise rotations of the input shaft.

Embodiment III

Figure 5:
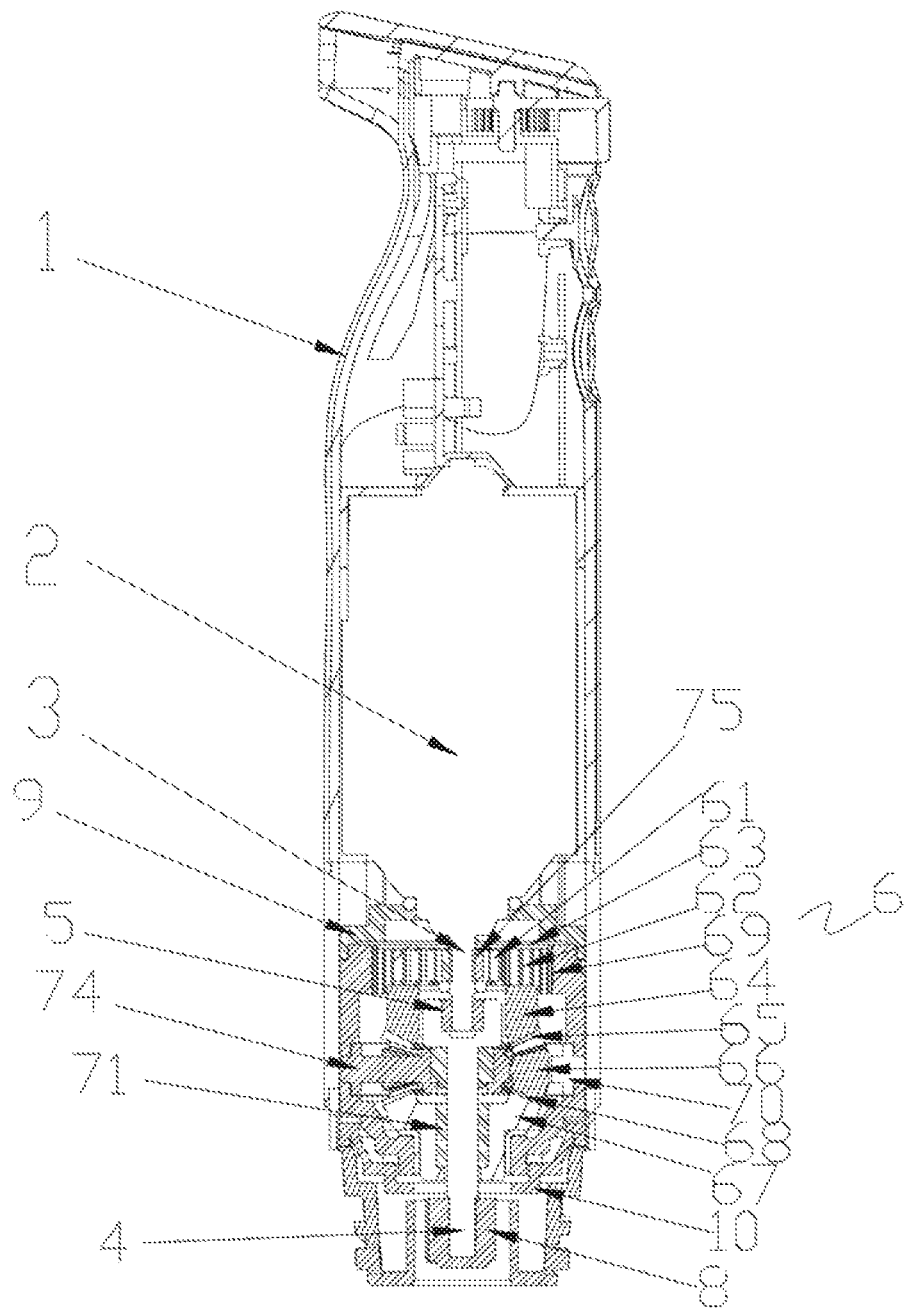
FIG. 5 is a cross-sectional view of a hand blender according to a third embodiment of the present invention.

As shown in FIG. 5, the structure of the hand blender with a built-in 2-speed gearbox in this embodiment is similar to the structure of that in the embodiment I, the difference is that, a one-way bearing II 75 is arranged between the input shaft and the sun gear, and another one-way bearing II 71 is arranged between the lower transmitting turntable and the output shaft. The one way bearing II 75 is locked when driven anticlockwise, when the input shaft 3 rotates clockwise, power is transmitted to the output shaft 4 through the one-way bearing, the output shaft 4 drives a stirring rod connected with the connector 8 to rotate, the connector 8 can connect different tools detachably such as a stirring tool, a cutting tool, etc. At this moment, the differential transmission assembly 6 rotates freely because the one-way bearing II 75 is locked to rotate anticlockwise, the driving force of the input shaft 3 is not transmitted to the differential transmission assembly 6, therefore the differential transmission assembly 6 will not rotate to save power and to prolong the service lives of the drive parts. Under the above condition, a ratio of the input speed to the output speed is 1:1.

When the input shaft 3 rotates anticlockwise, power is not directly transmitted to the output shaft because the one-way bearing I rotates freely. At this moment, the input shaft 3 drives the differential transmission assembly 6 to rotate via the one-way bearing II 75 which is locked to rotate anticlockwise. Specifically, the sun gear 61 rotates anticlockwise, the sun gear 61 drives the planet gear set 62 to rotate, the planet gear set 62 and the annular gear 69 also rotate, the upper transmitting turntable 64 integrated with the planet gear set 62 and the upper bevel ring 65 also rotate anticlockwise, power is transmitted to the lower bevel ring 68 through the bevel gears 66, so that the lower transmitting turntable 67 rotates clockwise, power is thus transmitted to the output shaft 4 through the one-way bearing II 71 which is locked, the output speed of the output shaft is reduced compared to the input speed of the input shaft. Therefore, the blender coaxially outputs two different speeds in the same direction by input shaft rotating clockwise or anticlockwise.

The above embodiments are the preferred embodiments of the present invention. It should be noted that, without departing from the spirit of the present invention and its substantial teaching, changes and modifications such as the number of planet gear set or the number of bevel gears, the direction of rotation of the gears and the output shaft, and the location of the one-way bearing or its self-locking direction etc, would be allowable to be made by those skilled in the art according to the present invention, and these changes and modifications shall also fall within the scope of protection of the present invention.

What is claimed is:
1. A hand blender with a built-in 2-speed gearbox, comprising:
 a housing;
 a stirring tool;
 a motor (2) secured in the housing;
 an input shaft (3) connected to the motor and configured to rotate synchronously with the motor;
 an output shaft (4) meshing with the stirring tool and configured for outputting power to the stirring tool;
 a gearbox meshing with the input shaft and the output shaft, and configured for driving the output shaft to rotate in a first direction with a first speed when the motor rotates in the first direction, and for driving the output shaft to rotate in the first direction with a second speed when the motor rotates in a reverse direction;
 the input shaft and the output shaft are coaxially arranged, the gearbox comprises a constant transmission assembly, the constant transmission assembly is a first one-way bearing, an inner ring and an outer ring of the first one-way bearing are respectively engaged with the input shaft and the output shaft and are rotated coaxially therewith; rollers of the first one-way bearing are unlocked when the inner ring rotates in a second direction opposite to the first direction;
 the gearbox comprises a differential transmission assembly engaged with the input shaft and the output shaft; the differential transmission assembly is configured to transmit power to the output shaft when the motor rotates in a second direction that is opposite to the first direction, permitting the output shaft to rotate in the first direction with the second speed that is slower than the first speed;
 the differential transmission assembly comprises:
 a sun gear (61) which sleeves the input shaft and rotates along with the input shaft;
 an annular gear (69) fixed in the housing;

a planet gear set (62) received in the annular gear and directly engaged with both the sun gear and the annular gear;

a planetary carrier (63) for holding the planet gear set (62);

an upper transmission turntable (64) which is steadily connected with the planetary carrier and rotates synchronously with the planetary carrier;

an upper bevel ring (65) arranged at a lower end surface of the upper transmission turntable which faces the stirring tool;

a plurality of bevel gears (66) engaged with the upper bevel ring directly and uniformly and circumferentially distributed on the upper bevel ring;

a bevel gear carrier (70) fixed to the housing and configured for holding the plurality of bevel gears therein, wherein an inner surface of the bevel gear carrier defines a plurality of holes for receiving the gear axes (74) of the plurality of bevel gears;

a lower transmitting turntable (67) arranged under the bevel gear and sleeved on the output shaft, wherein an upper end surface of the lower transmitting turntable is arranged with a lower bevel ring (68) which directly engages with the plurality of bevel gears; and a second one-way bearing configured at one or both of the following positions: 1) between the input shaft and the sun gear, and 2) between the lower transmitting turntable and the output shaft;

wherein rollers of the second one-way bearing are unlocked when an inner ring of the second one-way bearing rotates in a first direction.

2. The hand blender of claim 1, wherein an upper end of the output shaft defines a counter bore (41), the outer ring of the first one-way bearing is fixed in the counter bore.

3. The hand blender of claim 1, wherein the planet gear set (62) comprises 3~5 planet gears, the planet gears are all circumferentially distributed uniformly on a lower end surface of the planetary carrier by their vertical spindles (72).

4. The hand blender of claim 1, wherein a plurality of fixed pins (76) fixes the planetary carrier and the upper transmission turntable to realize synchronous rotation of the planetary carrier and the upper transmitting turntable.

5. The hand blender of claim 4, wherein the fixed pins are vertical spindles extending downwardly into the interpenetrating holes (73) preinstalled in the planetary carrier.

6. The hand blender of claim 1, wherein a number of the bevel gears is 3~5, the bevel gears are arranged in the bevel gear carrier by their gear axes (74), the gear axes are perpendicular to the output shaft.

7. The hand blender of claim 1, wherein a lower end of the output shaft is provided with a connector (8) which is connected with the stirring tool.

8. The hand blender of claim 7, wherein an upper end cover (9) and a lower end cover (10) are configured under the motor and above the connector, respectively.

* * * * *